(12) United States Patent
Imundo, Jr. et al.

(10) Patent No.: US 10,087,512 B2
(45) Date of Patent: Oct. 2, 2018

(54) STEEL ARTICLE HAVING IMPROVED CONTACT FATIGUE RESISTANCE AND A METHOD OF MAKING

(71) Applicant: The Timken Company, North Canton, OH (US)

(72) Inventors: John R. Imundo, Jr., Kensington, CT (US); Vikram M. Bedekar, Canton, OH (US); Edward F Damm, Akron, OH (US); R. Scott Hyde, Massillon, OH (US)

(73) Assignee: The Timken Company, North Canton, OH (US)

( * ) Notice: Subject to any disclaimer, the term of this patent is extended or adjusted under 35 U.S.C. 154(b) by 549 days.

(21) Appl. No.: 14/421,285

(22) PCT Filed: Mar. 15, 2013

(86) PCT No.: PCT/US2013/031903
§ 371 (c)(1),
(2) Date: Feb. 12, 2015

(87) PCT Pub. No.: WO2014/028053
PCT Pub. Date: Feb. 20, 2014

(65) Prior Publication Data
US 2015/0211104 A1   Jul. 30, 2015

Related U.S. Application Data

(60) Provisional application No. 61/683,400, filed on Aug. 15, 2012.

(51) Int. Cl.
*C21D 6/00*   (2006.01)
*C23C 8/22*   (2006.01)
(Continued)

(52) U.S. Cl.
CPC ............ *C23C 8/80* (2013.01); *B32B 15/011* (2013.01); *C21D 1/06* (2013.01); *C21D 1/18* (2013.01);
(Continued)

(58) Field of Classification Search
CPC .... C21D 1/06–1/18; C21D 6/004–6/04; C22C 38/02–38/52; B32B 15/011
See application file for complete search history.

(56) References Cited

U.S. PATENT DOCUMENTS 3,262,776 A * 7/1966 Loeffler ............... C22C 38/12
                                                       148/622
5,002,729 A   3/1991 Wert et al.
(Continued)

FOREIGN PATENT DOCUMENTS

EP   1602744 A1   5/2005
EP   2284286 A2   2/2011
(Continued)

OTHER PUBLICATIONS

Turpin et al., Carbon Diffusion and Phase Transformations during Gas Carburizing of High-Alloyed Stainless Steels; Experimental Study and Theoretical Modeling, Metallurgical and Materials Transactions A, Oct. 2005, pp. 751-2760, vol. 36A.
(Continued)

*Primary Examiner* — Colleen P Dunn
(74) *Attorney, Agent, or Firm* — The Webb Law Firm

(57) ABSTRACT

A steel article with resistance to contact fatigue having a martensitic stainless steel body with a hardened surface layer and a core. The hardened surface layer is tempered martensite and $M_7C_3$ carbides, has at least 1.6 wt. % carbon, and has a depth equal to or greater than the depth where the steel article experiences the maximum shear stress when placed in service. Also, a method of manufacturing such as
(Continued)

a steel article having resistance to contact fatigue comprising: providing a martensitic stainless steel article having a prior austenite grain size of ASTM #6 or smaller; carburizing the surface of the steel article; solution treating the steel article; tempering the steel article for a first time; hardening the steel article; cooling the steel article at a temperature below 0° F.; and tempering the steel article for a second time.

11 Claims, 10 Drawing Sheets

(51) Int. Cl.
    *C23C 8/80*     (2006.01)
    *C21D 1/06*     (2006.01)
    *B32B 15/01*     (2006.01)
    *C21D 1/18*     (2006.01)
    *C21D 6/04*     (2006.01)
    *C22C 38/02*     (2006.01)
    *C22C 38/04*     (2006.01)
    *C22C 38/44*     (2006.01)
    *C22C 38/46*     (2006.01)
    *C22C 38/52*     (2006.01)
    *C23C 8/38*     (2006.01)
(52) U.S. Cl.
    CPC ............ *C21D 6/004* (2013.01); *C21D 6/005* (2013.01); *C21D 6/007* (2013.01); *C21D 6/008* (2013.01); *C21D 6/04* (2013.01); *C22C 38/02* (2013.01); *C22C 38/04* (2013.01); *C22C 38/44* (2013.01); *C22C 38/46* (2013.01); *C22C 38/52* (2013.01); *C23C 8/22* (2013.01); *C23C 8/38* (2013.01)

(56) References Cited

U.S. PATENT DOCUMENTS

| 6,689,312 | B2 * | 2/2004 | Lakeland | .............. C22C 38/002 |
| | | | | 148/325 |
| 7,648,588 | B2 | 1/2010 | Hammond et al. | |
| 8,308,873 | B2 | 11/2012 | Chin et al. | |
| 2005/0133119 | A1 * | 6/2005 | Hammond | ............... C21D 1/06 |
| | | | | 148/220 |

FOREIGN PATENT DOCUMENTS

| JP | 59-157273 | 9/1984 |
| JP | 11-193454 | 7/1999 |
| JP | 11-264016 | 9/1999 |
| WO | 01/68933 A2 | 9/2001 |

OTHER PUBLICATIONS

Zaretsky, Erwin, V., "Rolling Bearing Steels—A Technical and Historical Perspective", Materials Science and Technology, Jan. 2012, pp. 58-69, vol. 28, No. 1, Institute of Materials, Minerals and Mining, Great Britain.

* cited by examiner

STEEL ARTICLE HAVING IMPROVED CONTACT FATIGUE RESISTANCE AND A METHOD OF MAKING

CROSS-REFERENCE TO RELATED APPLICATIONS

This application is the United States national phase of International Application No. PCT/US2013/031903 filed Mar. 15, 2013, and claims priority to U.S. Provisional Patent Application No. 61/683,400 filed Aug. 15, 2012, the disclosures of which are hereby incorporated in their entirety by reference.

STATEMENT REGARDING FEDERALLY SPONSORED RESEARCH

This invention was made with government support under Contract No. F33615-03-D-2353 awarded by the United States Air Force Research Laboratory, Propulsion Directorate (AFRL/PRKB). The government has certain rights in the invention.

BACKGROUND OF THE INVENTION

Field of the Invention

The present invention relates generally to carburized martensitic stainless steel components and a method of making such components to optimize the hardened surface layer (case) microstructure for improved contact fatigue and spall propagation resistance.

Description of Related Art

One cause of failure in carburized components subjected to rolling or rolling/sliding contacts (e.g., rolling-contact bearings, gears, shafts, cam/tappet arrangements, and other power transmission components) is contact fatigue. Contact fatigue can be defined as the mechanism of crack initiation followed by crack propagation attributable to the near-surface alternating stress field within the contact bodies, which eventually leads to material removal. The alternating stress field in contact fatigue is either in pure rolling or a simultaneous combination of rolling and sliding conditions, depending on the absence or presence of gross sliding within the contact region. The degree of material removal in a contact fatigue failure varies from micropitting to macro-pitting and spalling. The alternating stress field responsible for contact fatigue failure can generally be idealized from Hertzian contact conditions in conventional metallic materials.

When a bearing, gear, or other power transmission component is properly lubricated, the contact fatigue phenomenon commences as a crack below the surface and propagates to the surface causing a pit or a spall. The high level of cleanliness of steels in current bearing technology is one factor in minimizing the probability of fatigue spalls. However, a second important factor is the micro-strain behavior of bearing and power transmission steels under the Hertzian stress condition due to contact fatigue. During the initial loading process, the contact material surfaces will experience an elastic response. The ability to maintain an elastic response during cyclic loading can be compromised by microstructural changes brought about by localized plastic strain, leading to localized damage and an increased probability for crack initiation and fatigue failure. Parameters such as the application stress, operating temperature, number of revolutions, and material parameters such as the alloy steel grade, heat treatment, residual stress level, and work hardening response, affect the ability to maintain an elastic response during cyclic contact fatigue loading.

Localized micro-strain precedes crack initiation and typically occurs at microstructural discontinuities such as inclusions and carbide clusters where the resultant stress exceeds the local micro-yield limit at that fatigue cycle. The cyclic strain amplitudes due to contact fatigue vary as a function of depth and operating conditions such that a maximum shear is created at a certain depth. The material response due to contact fatigue can be described as a four-stage process: (1) break in or shake down, (2) steady-state elastic response, (3) instability resulting in crack initiation, and then (4) crack propagation which eventually leads to spalling and material removal or loss. Stages 1-3 control what is considered high cycle fatigue and stage 4 will control low cycle fatigue.

In many circumstances, it is of primary interest to optimize the high cycle fatigue response of materials, which results in extended performance. However, in some situations, crack and/or spall propagation is equally important and must be considered when selecting material-heat treatment combinations. These cracks are most often found to originate in the region of maximum shear stress below the contact surface. When the cracks reach a critical length or depth, the cracks branch up toward the free surface, removing a piece of surface material and forming a pit. Crack propagation is controlled by loading conditions, as well as material physical properties and microstructural characteristics. Examples of material physical properties include: hardness, tensile strength, elongation, elastic modulus, crack propagation rates, and fracture toughness. Many of these physical properties are controlled by the microstructural characteristics necessary for operation of power transmission components. Some of the microstructural characteristics include: carbide structure, morphology, and distribution, retained austenite, carbon concentration, martensite structure, and carbide crystallographic structure and chemical composition.

A typical martensitic stainless steel used in such carburized components comprises a base carbon content of 0.05-0.1 wt. % and 11-15 wt. % Cr, 1.5-3.5 wt. % Ni, 1-3 wt. % Mo, 3-8 wt. % Co, up to 1.5 wt. % Mn, and 0.1-1 wt. % V, with the remainder comprised of iron and incidental impurities as disclosed in U.S. Pat. No. 5,002,729.

Prior art martensitic stainless case hardened steel components have focused on other desirable characteristics for the component and have failed to account for contact fatigue and subsequent spalling. One group of prior art components and processes strictly focuses on the hardness of the hardened surface layer. The components are commonly carburized to a total carbon content of about 0.65 wt. % to about 1.0 wt. % which, as will be discussed later, results in a final microstructure of the hardened surface layer having both $M_7C_3$ carbides and $M_{23}C_6$ carbides. As will be explained in reference to the present invention, this microstructure does not have sufficient resistance to contact fatigue and, therefore, has the potential for spalling. One such prior art component and process is described in U.S. Pat. No. 7,648,588.

Another group of prior art components and processes strictly focuses on the corrosion resistance of the outer hardened surface layer. The hardened steel layer is carburized to a total carbon content of about <1.75 wt. % and other elements, such as Cr, Mo, Ni, and Co, are balanced to provide a hardened surface layer microstructure having substantially no carbides. One such prior art component and process is described in U.S. Pat. No. 8,308,873.

Neither of these groups of prior art components and processes either purposefully or inherently possess desirable resistance to contact fatigue and the resultant spalling.

SUMMARY OF THE INVENTION

The present invention is directed to a steel article having resistance to contact fatigue comprising a martensitic stainless steel body having a hardened surface layer and a core, wherein the hardened surface layer comprises tempered martensite and $M_7C_3$ carbides. The hardened surface layer comprises at least 1.6 wt. % carbon and, more preferably 1.6-2.4 wt. % carbon and has this prescribed range of carbon to a depth equal to or greater than the depth where the steel article will experience the maximum shear stress when placed in service. This thickness may be at least 0.001 inches. The steel article may comprise one or more of Cr, Ni, Mo, Co, Mn, and V, in addition to Fe and C, and, more preferably, 11-15 wt. % Cr, 1.5-3.5 wt. % Ni, 1-3 wt. % Mo, 3-8 wt. % Co, up to 1.5 wt. % Mn, and 0.1-1 wt. % V. As a result of the carbide formation, the hardened surface layer may be enriched in Ni and Co as compared to the core.

The present invention is also directed to a method of manufacturing a steel article having resistance to contact fatigue comprising: providing a martensitic stainless steel article having a prior austenite grain size of ASTM #6 or smaller; carburizing the surface of the steel article; solution treating the steel article; tempering the steel article for a first time; hardening the steel article; cooling the steel article at a temperature below 0° F.; and tempering the steel article for a second time. The steel article after carburizing and heat treatment has a hardened surface layer comprising tempered martensite and $M_7C_3$ carbides.

The method may further comprise one or more of conducting the carburizing of the steel article at 1600° F. to 1700° F., the solution treating of the steel article at 1750° F. to 2000° F. for 20 to 120 minutes, the tempering of the steel article for the first time at 1000° F. to 1250° F. for 2 to 5 hours, the hardening of the steel article at 1900° F. to 2000° F. for 15 to 60 minutes, cooling the steel article at −100° F. to −320° F. for a minimum of 1 hour, and tempering the steel article for a second time at 925° F. to 975° F. for 2 to 3 hours. The method may further comprise one or more of the following additional steps: rapidly quenching the steel article after solution treating the steel article and before tempering the steel article for the first time; and rapidly quenching the steel article in oil or inert gas to a temperature below the martensite start ($M_s$) temperature after hardening the steel article and before cooling the steel article at a temperature below 0° F. The last tempering step may optionally be repeated one or more times.

DESCRIPTION OF THE PREFERRED EMBODIMENTS

Figure 1:
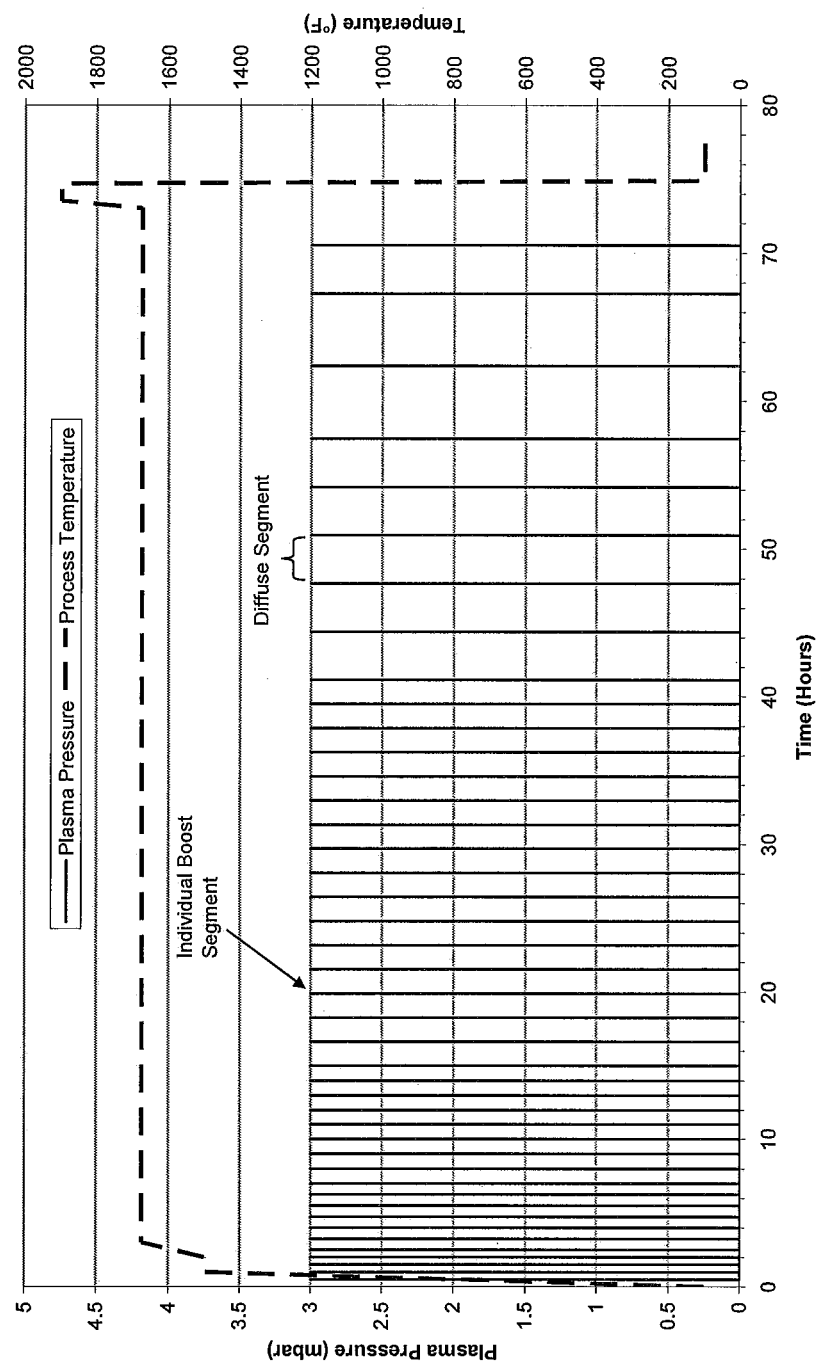
FIG. 1 is a graph showing a typical plasma assisted carburizing cycle as used in an embodiment of the present invention.

The enhanced properties of the present invention are at least partially achieved by producing a steel article having a hardened surface layer (carburized case) predominately composed of carbides with the $M_7C_3$ carbide composition in a tempered martensite matrix in the zone of maximum applied stress. This microstructure is achieved by maintaining a minimum carbon content of 1.6 wt. % within this zone. More preferably, the carbon content is 1.6-2.4 wt. %. The microstructure in the zone of maximum applied stress is comprised of a random distribution of intragranular carbides and is largely free of any continuous intergranular carbides. The processing of the martensitic stainless steels requires control of the pre-carburizing grain size (wrought, forging, and post forging thermal treatment), carburizing, and hardening processes.

The present invention may utilize a stainless steel comprising one or more of Cr, Ni, Mo, Co, Mn, and V, in addition to Fe and C. Such a steel may have a base carbon content of 0.05-0.1 wt. % and may comprise 11-15 wt. % Cr, preferably 12-14 wt. % Cr, and more preferably 12.75-13.5 wt. % Cr; 1.5-3.5 wt. % Ni, preferably 2.0-3.0 wt. % Ni, and more preferably, 2.25-2.75 wt. % Ni; 1-3 wt. % Mo, preferably 1.5-2.5 wt. % Mo, and more preferably 1.5-2.0 wt. % Mo; 3-8 wt. % Co, preferably 4-7 wt. % Co, and more preferably 4.75-5.75 wt. % Co; up to 1.5 wt. % Mn, preferably 0.25-1.25 wt. % Mn, and more preferably 0.5-1.0 wt. % Mn; and 0.1-1 wt. % V, preferably 0.4-0.8 wt. % V, and more preferably 0.5-0.7 wt. % V.

Stainless steel components are typically soft machined from forgings or wrought bar. In either case, for the present invention, the prior austenite grain size prior to carburizing is a fine grain size of ASTM #6 or finer (45 μm or less). The fine prior austenite grain size helps to promote uniform and rapid diffusion of carbon throughout the carburized case. Carbon diffuses preferentially along the grain boundaries. The increased grain boundary surface area per unit volume, due to the fine grain size, limits excessive carbon saturation and, thus, carbide precipitation as a network on the austenite grain boundaries, and promotes intragranular diffusion of carbon.

Control of the forging temperature between 1800° F. and 1900° F. promotes fine grain size but does not guarantee a grain size of ASTM #6 or finer. This is especially true for complex shaped forgings which require multiple reheats to complete the thermo-mechanical forming process. The thermo-mechanical processing can include upsetting, ring rolling, etc., but is not limited to these processes. The potential for coarse grains is not limited to forgings; large wrought bar sizes 5" diameter) can also exhibit grain sizes larger than ASTM #6. To guarantee a pre-carburized grain size of ASTM #6, a thermal treatment process is necessary for both forgings and wrought components. The thermal treatment process comprises a normalizing process followed by a subcritical anneal of the stainless steel components. Normalizing is carried out at a temperature between 1600° F. and 1800° F. Machined components or forgings are heated uniformly to the normalizing temperature and held at temperature for 1-2 hours. After the required soak time, the forgings/components are quenched rapidly, preferably at a rate of >25° F./second, to prevent any carbide precipitation on the grain boundaries during cooling. After normalizing, the components receive a subcritical anneal at a temperature between 1050° F. and 1300° F. for 4 to 24 hours and, preferably at a temperature between 1100° F. and 1250° F. for 4 to 24 hours.

Refinement of the microstructure is followed by carburizing. Addition of carbon can be accomplished by any known carburizing method including, but not limited to, vacuum or plasma assisted carburizing. Carburizing may be done at temperatures between 1600° F. and 1700° F. and, preferably, at 1625° F. to 1675° F. Precise control of the carbon flux may be used to prevent detrimental oversaturation of carbon on the grain boundaries resulting in a continuous or nearly continuous carbide network. A boost-diffuse type cycle may be used to control the carbon flux into the component. During the boost segments, carbon is transported into the surface of the work piece. Each boost is followed by a diffuse step during which the carbon diffuses into the work piece. Each boost step is designed to reach, but not exceed, the limit of carbon solubility in the austenite matrix. After each boost segment, the carburizing gas supply is stopped and the furnace is evacuated or a partial pressure of an inert gas such as nitrogen or argon is maintained during the diffuse segment. The duration of the boost cycles can be kept constant or varied throughout the entire carburizing cycle. The diffuse segments are increased as the cycle progresses as carbon diffusion requires longer times to reach deeper depths.

In plasma assisted carburization, boost segments can vary from 1-5 minutes. The carbon flux during each boost is regulated by the gas mixture, plasma pressure, pulse/pause ratio, and plasma current density. The gas mixture consists of a hydrocarbon, usually methane or propane, hydrogen, and argon. After each boost, the plasma is turned off and the gas mixture is evacuated. The diffusion cycles are significantly longer than the boost cycles and can vary from 30 to 120 minutes or longer depending on the target case depth. A typical plasma assisted cycle is shown in FIG. 1.

In vacuum carburizing, boost segments can vary from seconds to minutes (30 seconds to 2 minutes). The carbon flux of each boost is regulated by the hydrocarbon gas, gas pressure, and gas flow rate. Hydrocarbons including, but not limited to, propane ($C_3H_8$), acetylene ($C_2H_2$), ethylene ($C_2H_4$), cyclohexane ($C_6H_{12}$), and mixtures of ethylene, acetylene, and hydrogen can be used during the boost segments. Diffusion segments are comparable to those used in plasma assisted carburizing.

The final diffuse segment, regardless of the process, is a high temperature solutionizing step designed to refine the microstructure and increase the depth of carbon penetration in the work piece. The final diffuse segment is conducted at 1750° F. to 2000° F. for 20-120 minutes, preferably at 1900° F. to 1975° F. for 30-60 minutes, and more preferably 1900° F. to 1950° F. for 30-60 minutes. After solutionizing, the work piece is quenched rapidly in oil or inert gas, preferably at 25° F./sec or faster, to avoid any carbide precipitation on the grain boundaries. After carburizing and solutionizing, the work piece is tempered at 1000° F. to 1250° F. for 2-5 hrs.

After carburizing, the work piece is hardened, subzero cooled, and tempered. Hardening consists of heating to 1900° F. to 2000° F., and, preferably to 1925° F. to 1975° F., for a period of time long enough to dissolve a portion of the carbides into solution but not long enough to coarsen the grain size. Times may range from 15-60 minutes and, preferably, from 15-45 minutes. After holding at temperature, the work piece is quenched rapidly to below the martensite start temperature ($M_s$). The work piece is quenched fast enough to avoid carbide precipitation on the prior austenitic grain boundaries, for example, at 25° F./sec. or more. Within one hour after cooling to room temperature, the work piece is subzero cooled to a temperature between −100° F. and −320° F. for a sufficient period of time to ensure the entire section has cooled to the set temperature and then held there for a minimum of one hour. After removal from the subzero cool, the work piece is allowed to warm to room temperature in still air or by fan warming. Within one hour after warming to room temperature, the parts are tempered at 925° F.-975° F. for 2-3 hrs and, preferably at 925° F.-950° F. for 2-3 hrs. After the initial temper, the work piece may be tempered one or two additional times for a total of two or more tempers.

Microstructural—Carbide Development

Figure 2:
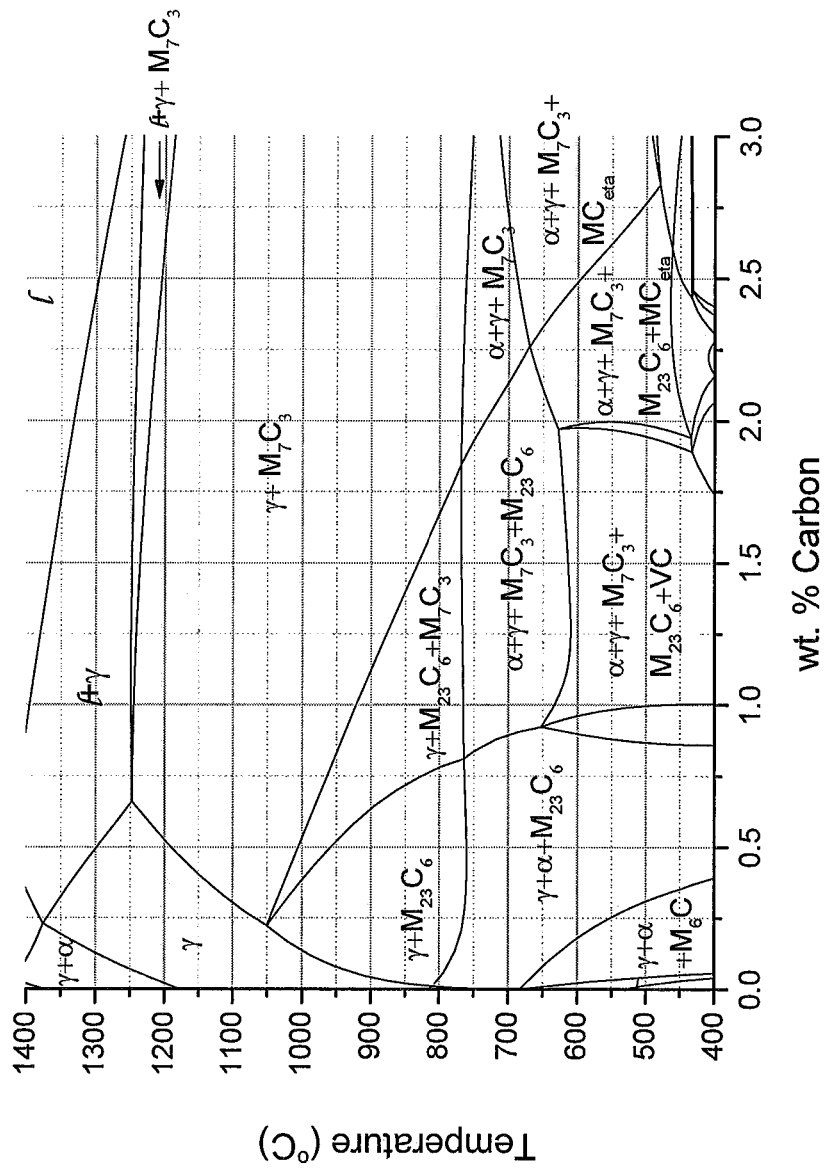
FIG. 2 is an isoplethal phase diagram as a function of carbon content and temperature for an exemplary steel.

FIG. 2 shows a computational thermodynamic (Thermo-Calc Version S, TCFE7 Database) assessment of an exemplary martensitic stainless steel having a nominal chemistry given in Table 1. At a carburizing temperature of 900° C. (1652° F.) and carbon contents between approximately 0.04 wt. % and 0.63 wt. %, austenite (γ) and $M_{23}C_6$ carbide phases are stable as primary carbides or carbides present in austenite at carburizing or hardening temperatures. At carbon contents between approximately 0.63 wt. % and 1.12 wt. %, austenite (γ), $M_{23}C_6$ and $M_7C_3$ primary carbide phases are stable. Above 1.12 wt. % carbon austenite (γ) and $M_7C_3$ primary carbide phases are stable.

TABLE 1

| Nominal composition in wt. % for the exemplary steel alloy | | | | | | |
|---|---|---|---|---|---|---|
| Mn | Si | Cr | Ni | Mo | V | Co |
| 0.7 | 0.4 | 13 | 2.5 | 1.8 | 0.6 | 5.25 |

Unexpectedly, it has been found that microstructures containing predominantly $M_7C_3$ primary carbides are more resistant to contact damage than microstructures containing $M_{23}C_6$ primary carbides. Hence, microstructures with primary $M_7C_3$ carbides provide better component life for components such as bearings or gears which undergo contact fatigue loading. In order to improve component life and provide spalling resistance, the microstructure of the carburized case is designed such that $M_7C_3$ carbides in a matrix of tempered martensite are present at the location of maximum shear stresses.

In order to have a microstructure comprising $M_7C_3$ carbides in a matrix of tempered martensite in the hardened surface layer of the finished component to provide improved resistance to contact fatigue, a similar microstructure must be developed at the carburizing temperature. In order to achieve this desired microstructure at a carburizing temperature of 900° C. (1652° F.), computational thermodynamics predicts that it is necessary to carburize to a minimum carbon content of 1.12 wt. % at the depth of maximum shear stress in order to dissolve the $M_{23}C_6$ primary carbides and form $M_7C_3$ primary carbides. In practice, it has been found that the $M_{23}C_6$ primary carbides formed in the early stages of carburizing are kinetically stable beyond this limit and that it is necessary to carburize to greater than 1.6 wt. % carbon at the depth of maximum shear stress in order to dissolve pre-existing $M_{23}C_6$ primary carbides and form sufficient $M_7C_3$ primary carbides. In addition, it is preferable to drive the detrimental $M_{23}C_6$ primary carbides to a depth sufficiently below the depth of maximum shear stress by exceeding the thermodynamically predicted carbon limit of 1.12 wt. % C by a minimum of 0.48 wt. % C, yielding total carbon of 1.6 wt. % or greater.

Two components made from the exemplary steel described in Table 1 were carburized and heat treated. The first was carburized and heat treated according to the method of the present invention to provide both surface hardness and spalling resistance. The second was treated according to a commonly known carburizing and heat treating method used to achieve only a hardened surface layer.

Both components were subjected to failure progression testing. Failure progression tests are composed of an initiation stage and a propagation stage. The initiation stage begins by unnaturally damaging a new component and then growing that seeded fault into a spall. The post-initiation spalls typically represent or simulate the morphology of a naturally occurring spall. Once initiation is complete the propagation study begins. The propagation phase studies the bearing's resistance to spall growth. The bearing runs continuously until vibration, temperature, or mass loss exceed a predefined threshold. The sample made according to the method of the present invention had a spall initiation time of 18.9 hours and ran 100 hours during the propagation phase without reaching the test threshold. The sample made according to the commonly known method had a spall initiation time of 6.65 hours and failed during the propagation phase in 1.2 hours. Thus, the sample made according to the method of the present invention had about 3× the initiation time and 85× the spall propagation time compared to the sample made according to the commonly known method.

Figure 3:
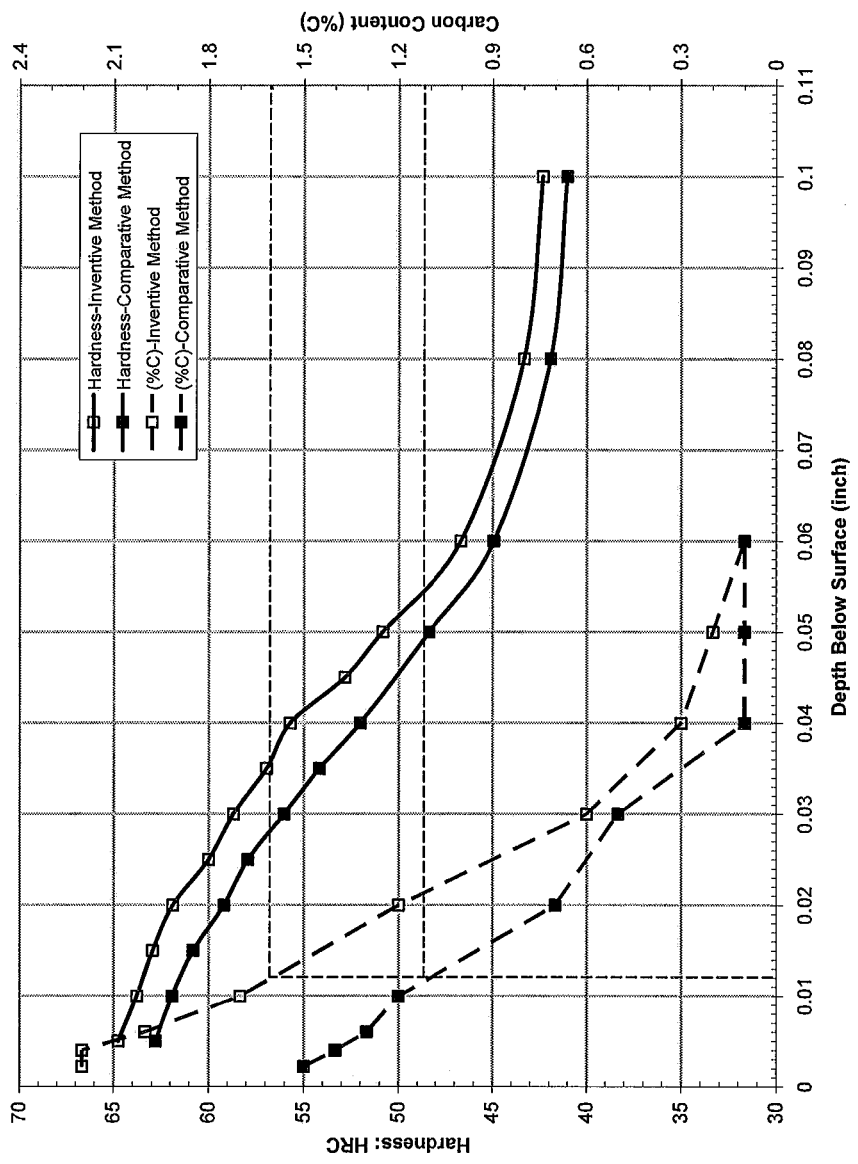
FIG. 3 is a graph showing the correlation between the carbon content, hardness, and spalling resistance for a component made according to the inventive method and a component made according to the commonly known method.

FIG. 3 shows hardness and carbon plotted as a function of depth for the two components. It can be seen that, while the hardness of the two components is nearly the same, the component made according to the method of the present invention and having good spalling resistance has about 1.6 wt. % carbon at the depth of maximum shear stress, 0.012 inches, while the component made according to the commonly known method and having poor spalling resistance has only about 1.12 wt. % carbon at this depth.

Figure 4:
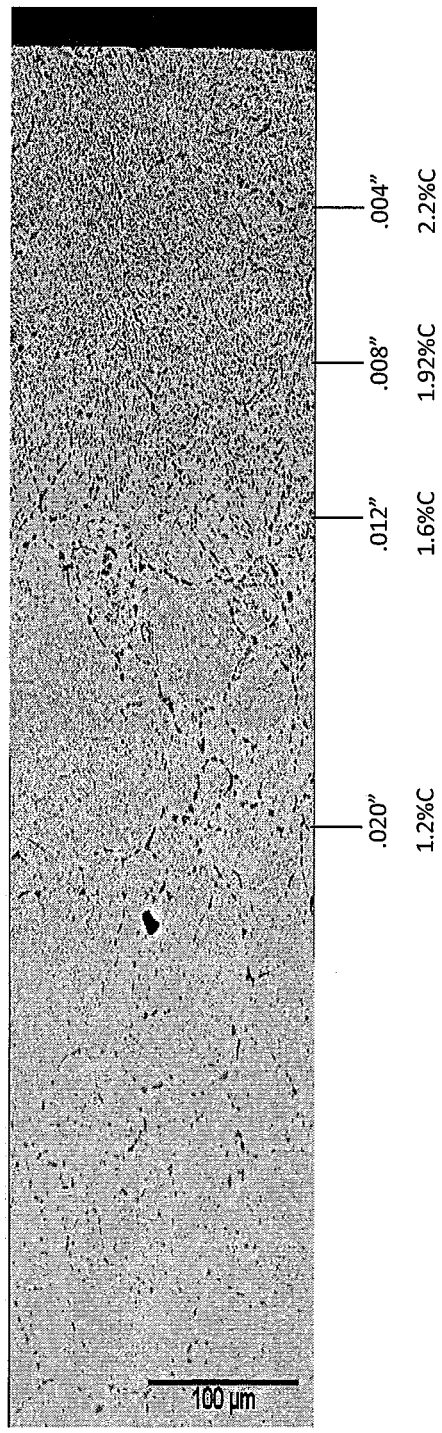
FIG. 4 is a photomicrograph of the hardened surface layer of a component made according to the inventive method and having good spalling resistance.

Not only do the components have different carbon contents, but their microstructures are also significantly different. A photomicrograph of the component made according to the method of the present invention and having good spalling resistance is shown in FIG. 4. As can be seen in the photomicrograph, the inventive microstructure has tempered martensite and between 15 and 40% area fraction of carbides, with 90% or greater of the carbides being $M_7C_3$, from the surface to a depth of 1.7 wt. % carbon. From 1.7 to 1.6 wt. % carbon, the microstructure transitions to a mixture of $M_7C_3$ and $M_{23}C_6$ carbides. From 1.6 to 1.2 wt. % carbon (0.012 inches to 0.020 inches), the microstructure has about 10-15% area fraction of both $M_7C_3$ grain boundary carbides and $M_{23}C_6$ intragranular carbides, with about 50% of the carbides being $M_7C_3$ carbides and about 50% of the carbides being $M_{23}C_6$ carbides. As the carbon content decreases the ratio of $M_{23}C_6$ to $M_7C_3$ carbides increases. Below 1.2 wt. % carbon (deeper than 0.020 inches), the microstructure has about 5-10% area fraction of mostly $M_{23}C_6$ carbides, with about 90% of the carbides being $M_{23}C_6$ carbides. The poor microstructure begins at less than 1.6 wt. % carbon and, thus, has a microstructure of $M_7C_3$ grain boundary carbides and $M_{23}C_6$ intragranular carbides which promote intergranular fracture instead of the mixed mode fracture found in the inventive microstructure. The $M_7C_3$ carbides present to a depth of approximately 0.012 inches are primarily intragranular with very few being found on the grain boundaries. Deeper into the component where the carbon has dropped to less than 1.5 wt. %, it can be seen that the $M_7C_3$ have primarily formed on the grain boundaries. When these carbides on the grain boundaries are present closer to the surface and the component is exposed to contact fatigue stresses they will cause initiation and propagation of cracking. However, in the case of the component having good spalling resistance, these carbides are only present at a depth below the depth where the maximum shear stress of the component due to contact fatigue occurs and, therefore, they do not cause excessive spall growth rates.

Figure 5:
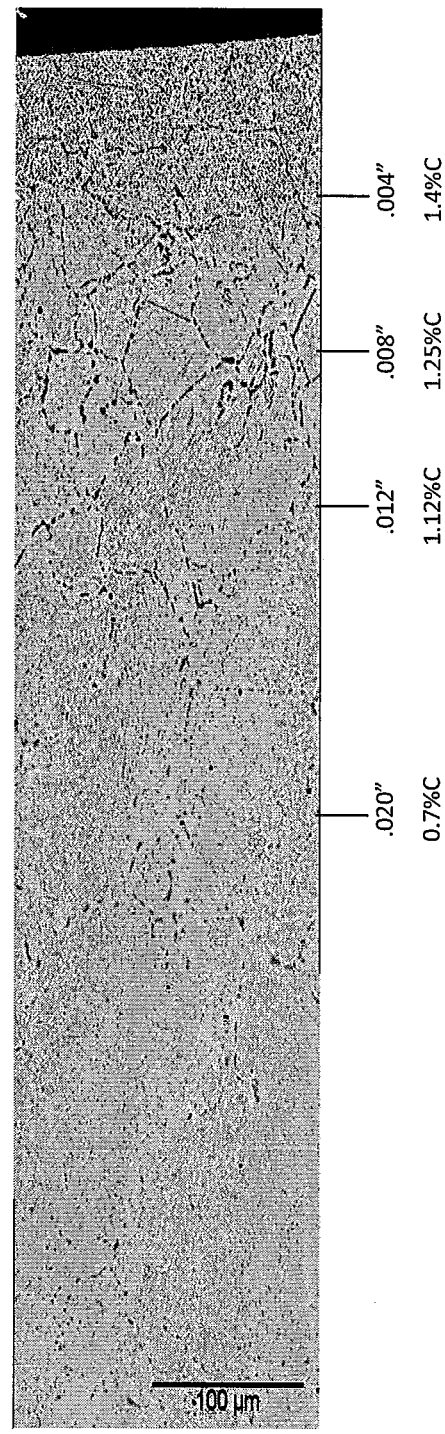
FIG. 5 is a photomicrograph of the hardened surface layer of a component made according to the commonly known method and having poor spalling resistance.

A photomicrograph of the component made according to the commonly known method and having poor spalling resistance is shown in FIG. 5. As can be seen in the photomicrograph, the comparative microstructure has tempered martensite and between 10 and 15% area fraction of carbides, with approximately 50% of the carbides being $M_7C_3$ and the balance being $M_{23}C_6$. The carbon in the microstructure is 1.6 to 1.2 wt. %. As the carbon content decreases, the ratio of $M_{23}C_6$ to $M_7C_3$ carbides increases. Below 1.2 wt. % carbon, the microstructure is tempered martensite with about 5-10% area fraction of mostly $M_{23}C_6$ carbides, with about 90% of the carbides being $M_{23}C_6$ carbides. The poor microstructure begins at less than 1.6 wt. % carbon and, thus, has a microstructure of $M_7C_3$ grain boundary carbides and $M_{23}C_6$ intragranular carbides which promote intergranular fracture instead of the mixed mode fracture found in the optimal inventive microstructure.

Figure 6:
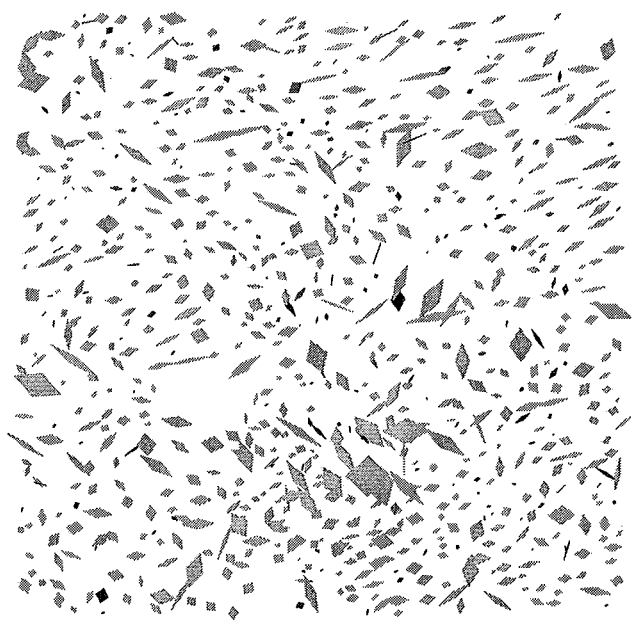
FIG. 6 is an image analysis of the carbides at the depth of maximum shear of a component made according to the inventive method.
Figure 7:
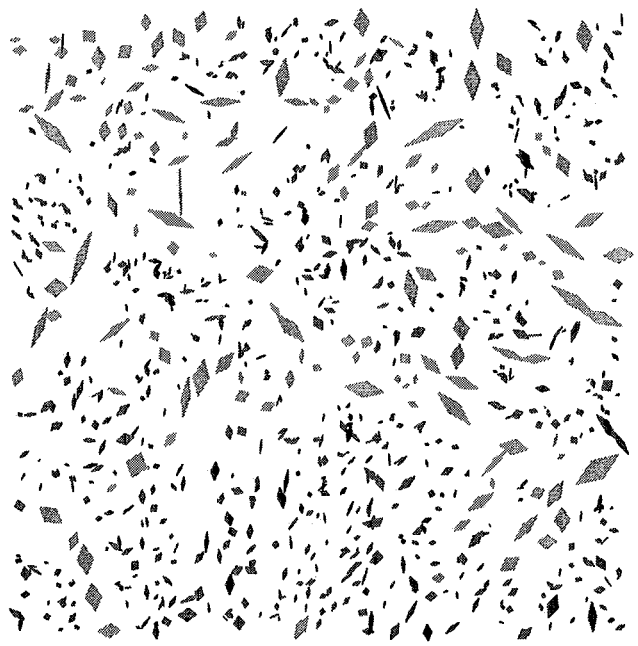
FIG. 7 is an image analysis of the carbides at the depth of maximum shear of a component made according to the commonly known method.
Figure 8:
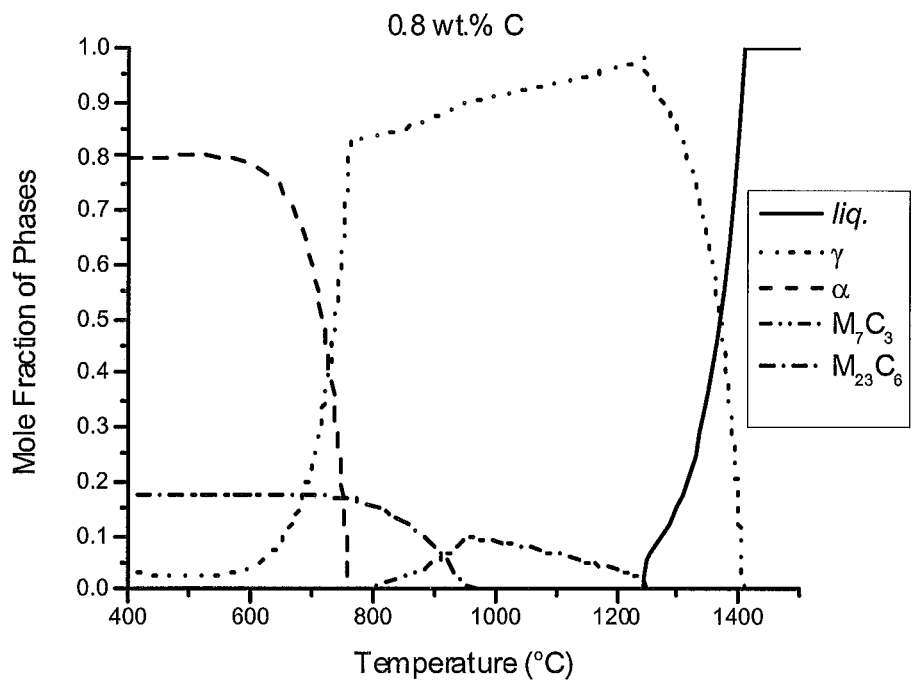
FIG. 8 shows a graph showing the mole fraction of phases versus temperature for the exemplary steel carburized to 0.8 wt. % carbon.

FIGS. 6 and 7 show image analysis representative of the depth of maximum shear (0.012 inches) for the inventive and comparative examples, respectively. In this image analysis, $M_7C_3$ carbides are gray and $M_{23}C_6$ carbides are black. These image analyses further illustrate the difference in microstructure between components made by the method of the present invention and the components made by the commonly known method. The spalling resistance of the two components can be directly related to their microstructure. The microstructure of the component made by the method of the present invention promotes mixed mode fracture resulting in good spalling resistance, while the microstructure of the component made by the commonly known method promotes intergranular fracture resulting in poor spalling resistance.

As described above, that the sample made according to the present invention and having higher carbon values has a microstructure having primarily $M_7C_3$ primary carbides in the surface hardened layer of the component at the depth of maximum shear stress resulting in good spalling resistance, and the sample made according to the commonly known method, has a microstructure that includes a combination of $M_7C_3$ and $M_{23}C_6$ primary carbides in the surface hardened layer of the component at the depth of maximum shear stress resulting in poor spalling resistance.

The hardened surface layer having the desired microstructure described above should extend to a depth equal to or greater than the depth at which the maximum stress due to contact fatigue occurs in order to provide the desired spalling resistance. Depending on the component and/or loading, this depth typically is 0.001-0.080 inches.

Figure 9:
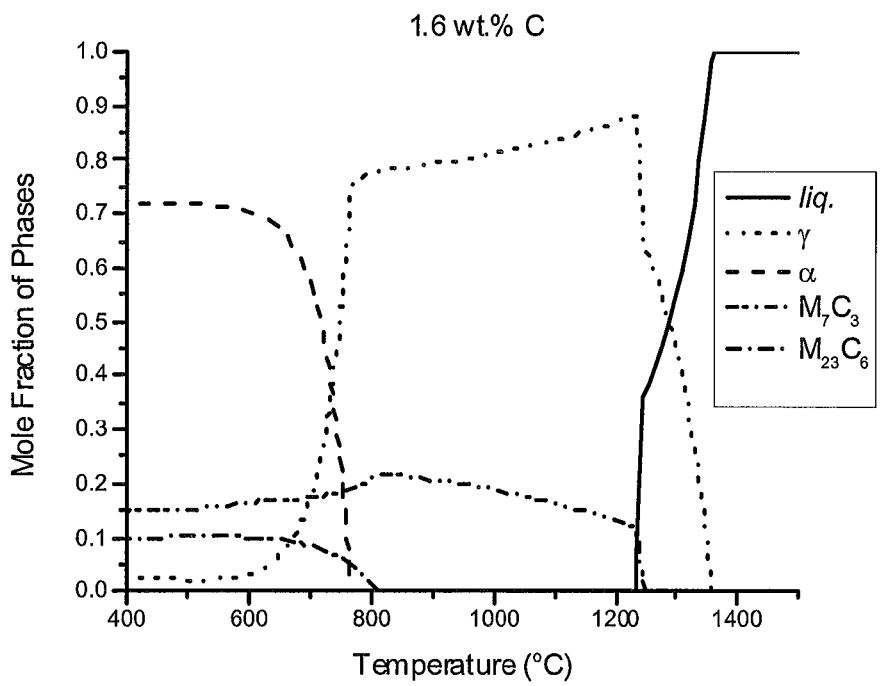
FIG. 9 shows a graph showing the mole fraction of phases versus temperature for the exemplary steel carburized to 1.6 wt. % carbon.
Figure 10:
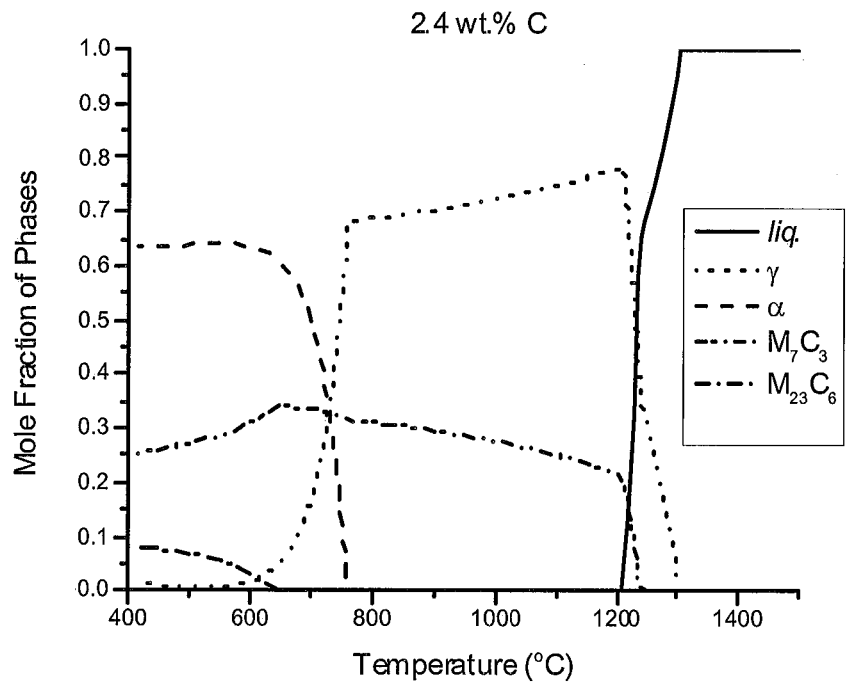
FIG. 10 shows a graph showing the mole fraction of phases versus temperature for the exemplary steel carburized to 2.4 wt. % carbon.
Figure 11:
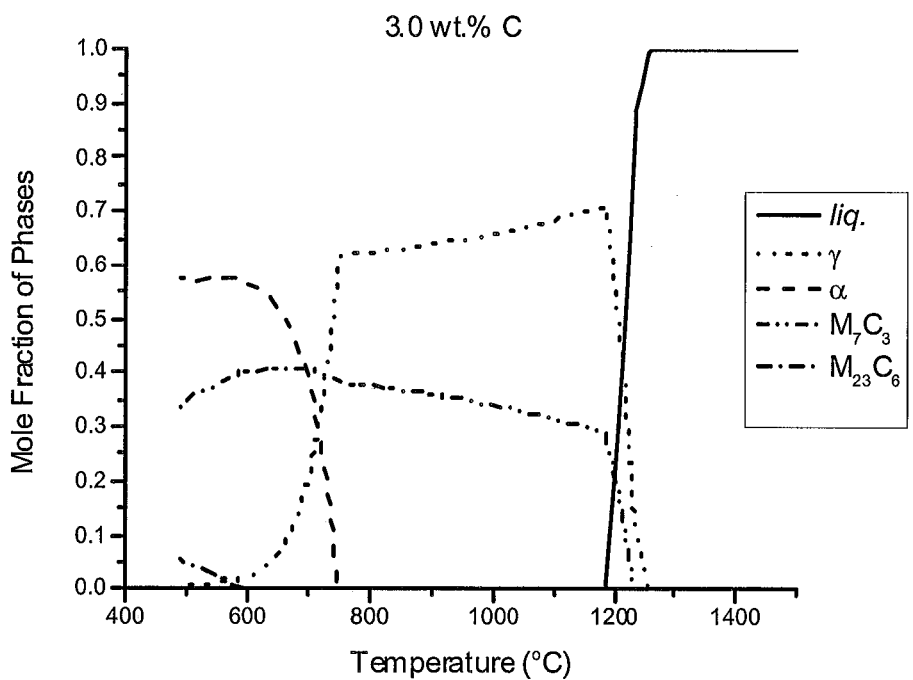
FIG. 11 shows a graph showing the mole fraction of phases versus temperature for the exemplary steel carburized to 3.0 wt. % carbon.
Figure 12:
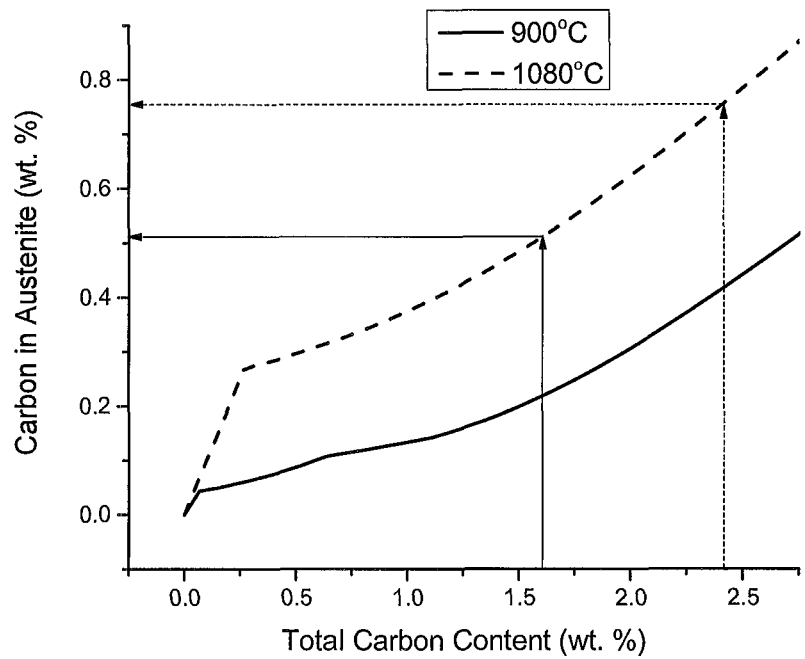
FIG. 12 shows the carbon content in austenite of the exemplary steel as a function of total carbon content at 900° C. (1652° F.) and 1080° C. (1975° F.)

FIGS. 8-11 show the mole fraction of phases versus temperature data for the exemplary martensitic stainless steel carburized to 0.8, 1.6, 2.4, and 3.0 wt. % carbon, respectively. This series of figures illustrates the stabilization of $M_7C_3$ in favor of $M_{23}C_6$ as total carbon content increases. They also illustrate the decrease in austenite mole fraction as the $M_7C_3$ primary carbide content increases with increasing carbon content. FIG. 9 shows the calculated mole fraction of phases versus temperature for the exemplary martensitic stainless steel carburized to 1.6 wt. % carbon. At a carburizing temperature of 900° C. (1652° F.), the calculations predict 0.21 mole fraction of $M_7C_3$ primary carbide in austenite and no $M_{23}C_6$ carbides. Carbide phases formed in austenite deplete the carbon content of the austenite. For a given temperature, the amount of carbon in the austenite, and the volume fraction of carbides are dependent on the total carbon content. When the carburized component is quenched from hardening temperatures between 1038° C. (1900° F.) and 1093° C. (2000° F.), the microstructure contains austenite (γ) and carbides. Upon quenching, the austenite transforms to martensite. The hardness and strength of the martensite is strongly dependant on the carbon content of the austenite from which it forms. Thus, the total carbon and hardening temperatures are balanced to provide adequate carbon in the austenite for hardness and also favor the desired $M_7C_3$ carbides. For example, FIG. 12 shows carbon content of austenite as a function of total carbon content computed at 900° C. (1652° F.) and 1080° C. (1975° F.). When a hardening temperature of 1080° C. (1975° F.) is used in combination with total carbon contents in excess of 1.6 wt. % so that the austenite contains 0.5 wt. % or more carbon upon hardening, sufficient hardness and strength of the as quenched, and quenched and tempered martensite can be achieved while still producing the inventive microstructure having $M_7C_3$ carbides. The total carbon content of 1.6 wt. % and the resultant carbon in austenite in excess of 0.5 wt. % is annotated in FIG. 12 with solid lined arrows. The dash lined arrows annotate a condition wherein a total carbon content of 2.4 wt. % yields carbon in the austenite of approximately 0.75 wt. %.

Figure 13:
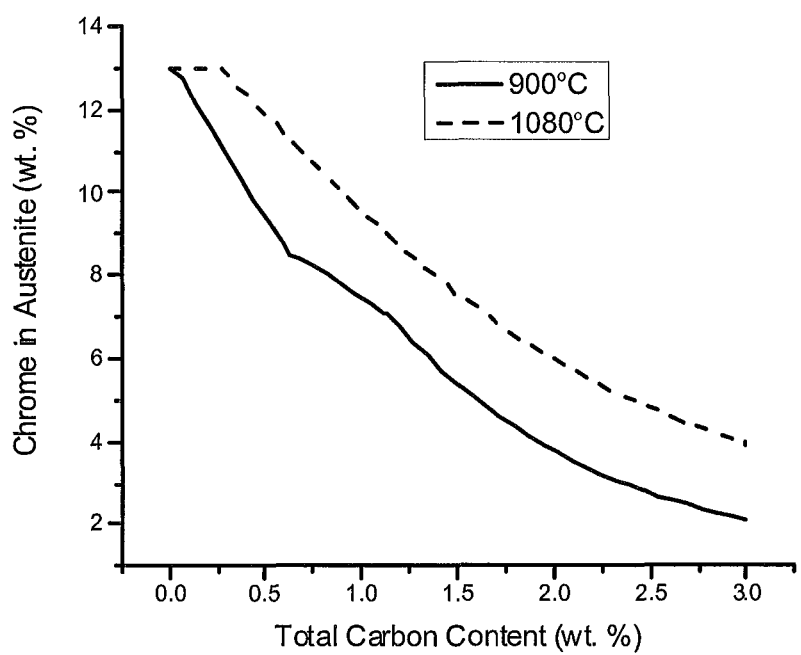
FIG. 13 shows the chrome content in austenite of the exemplary steel as a function of total carbon content at 900° C. (1652° F.) and 1080° C. (1975° F.)
Figure 14:
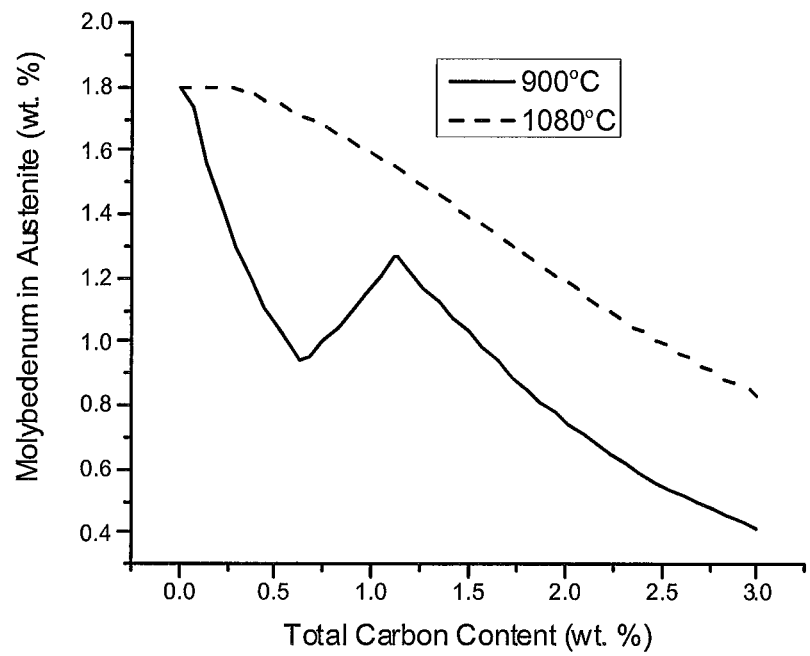
FIG. 14 shows the molybdenum content in austenite of the exemplary steel as a function of total carbon content at 900° C. (1652° F.) and 1080° C. (1975° F.)
Figure 15:
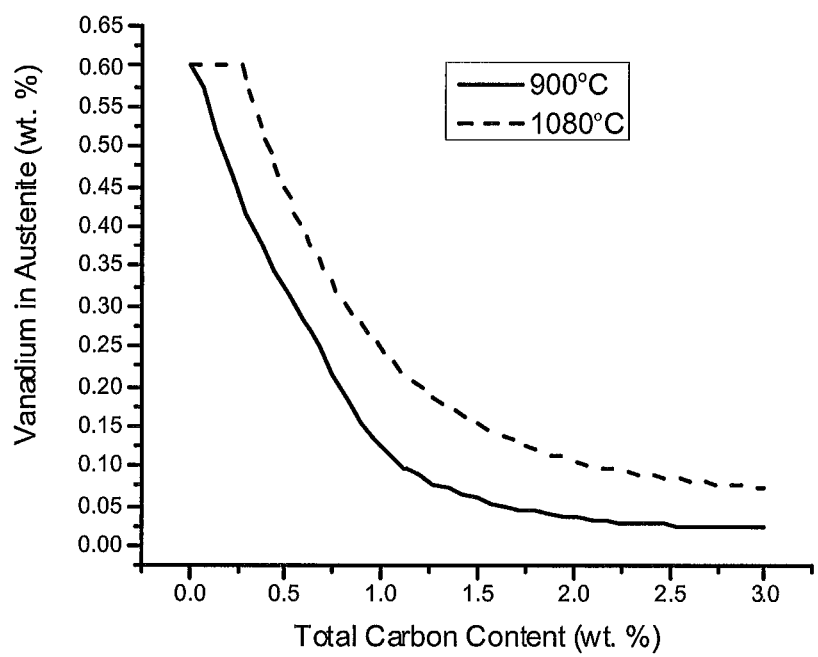
FIG. 15 shows the vanadium content in austenite of the exemplary steel as a function of total carbon content at 900° C. (1652° F.) and 1080° C. (1975° F.)
Figure 16:
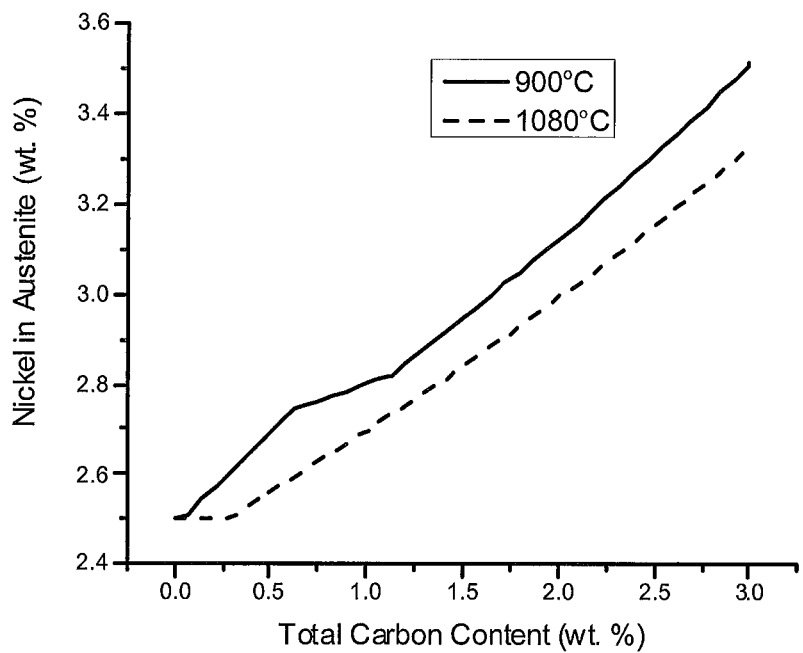
FIG. 16 shows the nickel content in austenite of the exemplary steel as a function of total carbon content at 900° C. (1652° F.) and 1080° C. (1975° F.)
Figure 17:
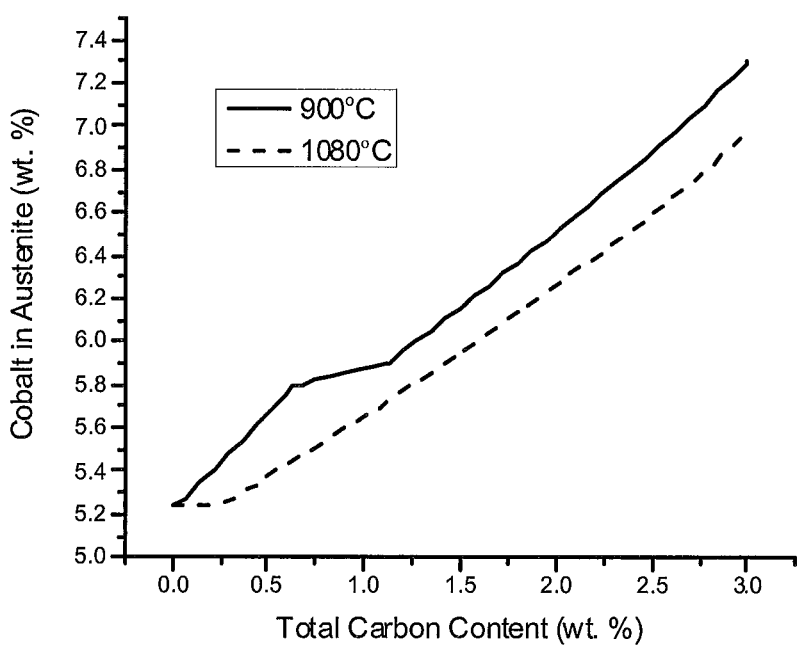
FIG. 17 shows the cobalt content in austenite of the exemplary steel as a function of total carbon content at 900° C. (1652° F.) and 1080° C. (1975° F.).

FIGS. 13-15 show how the chromium (Cr), molybdenum (Mo), and Vanadium (V) content of the austenite and eventual martensite are affected by total carbon content at 900° C. (1652° F.) and 1080° C. (1975° F.). As carbon increases, these strong carbide forming elements are consumed in the formation of carbides, leaving the austenitic matrix with less of each. FIGS. 16 and 17 show that as the carbon content increases, nickel (Ni) and cobalt (Co) concentrations in the austenite increase helping to maintain corrosion resistance and fatigue performance. Ni and Co remain in the austenite, but as more carbide is formed there is less austenite available, hence increasing the Ni and Co concentration.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of manufacturing a martensitic stainless steel article having resistance to contact fatigue comprising:
    a) providing a martensitic stainless steel article having a prior austenite grain size of ASTM #6 or smaller;
    b) carburizing the surface of the steel article at a first temperature;
    c) heating the steel article from the first temperature to a second temperature that is greater than the first temperature, wherein the steel article is heated directly from the first temperature to the second temperature;
    d) solution treating the steel article at the second temperature;
    e) rapidly quenching the steel article from the second temperature to a third temperature that is lower than the second temperature;
    f) tempering the steel article for a first time;
    g) hardening the steel article;
    h) cooling the steel article at a temperature below 0° F.; and
    i) tempering the steel article for a second time,
    wherein the steel article after carburizing and heat treatment has a hardened surface layer comprising $M_7C_3$ carbides in a tempered martensite matrix, and
    wherein the hardened surface layer comprises at least 1.6 wt. % carbon.

2. The method of claim 1, further comprising one or more of conducting the carburizing of the steel article at 1600° F. to 1700° F., the solution treating of the steel article at 1750° F. to 2000° F. for 20 to 120 minutes, the tempering of the steel article for the first time at 1000° F. to 1250° F. for 2 to 5 hours, the hardening of the steel article at 1900° F. to 2000° F. for 15 to 60 minutes, the cooling of the steel article at −100° F. to −320° F. for a minimum of 1 hour, and the tempering of the steel article for a second time at 925° F. to 975° F. for 2 to 3 hours.

3. The method of claim 1 further comprising rapidly quenching the steel article to a temperature below the martensite start ($M_s$) temperature after hardening the steel article and before cooling the steel article at a temperature below 0° F.

4. The method of claim 1, further comprising repeating the last tempering step one or more times.

5. The method of claim 1, wherein the hardened surface layer comprises 1.6-2.4 wt. % carbon.

6. The method of claim 1, wherein the hardened surface layer has a depth equal to or greater than a depth where the steel article will experience a maximum shear stress when placed in service.

7. The method of claim 6, wherein the hardened surface layer has a thickness of at least 0.001 inches.

8. The method of claim 1, wherein the steel article comprises one or more of Cr, Ni, Mo, Co, Mn, and V.

9. The method of claim 8, wherein the steel article comprises 11-15 wt. % Cr, 1.5-3.5 wt. % Ni, 1-3 wt. % Mo, 3-8 wt. % Co, up to 1.5 wt. % Mn, and 0.1-1 wt. % V.

10. The method of claim 1, wherein the steel article is given a refinement treatment prior to carburizing comprising:
   a) normalizing the steel article;
   b) quenching the steel article rapidly; and
   c) subcritically annealing the steel article.

11. The method of claim 10, wherein the refinement treatment further comprises one or more of normalizing at 1600° F. to 1800° F. and soaking for 1-2 hours and subcritical annealing at 1050° F. to 1300° F. for 4 to 24 hours.

* * * * *